United States Patent
Anderson et al.

(10) Patent No.: US 7,934,742 B2
(45) Date of Patent: May 3, 2011

(54) APPARATUS FOR RAISING A SPRING ARM ON A TRAILER HITCH

(75) Inventors: Jed Anderson, Lindon, UT (US); Fred P. Smith, Alpine, UT (US)

(73) Assignee: Progress Mfg., Inc., Provo, UT (US)

( * ) Notice: Subject to any disclaimer, the term of this patent is extended or adjusted under 35 U.S.C. 154(b) by 0 days.

(21) Appl. No.: 12/181,263

(22) Filed: Jul. 28, 2008

(65) Prior Publication Data

US 2008/0277903 A1 Nov. 13, 2008

Related U.S. Application Data

(63) Continuation of application No. 12/002,738, filed on Dec. 17, 2007, now abandoned, which is a continuation of application No. 11/881,811, filed on Jul. 27, 2007, now abandoned, which is a continuation of application No. 11/714,688, filed on Mar. 5, 2007, now abandoned, which is a continuation of application No. 11/546,016, filed on Oct. 10, 2006, now abandoned, which is a continuation of application No. 11/408,786, filed on Apr. 21, 2006, now abandoned, which is a continuation of application No. 11/251,619, filed on Oct. 14, 2005, now abandoned.

(60) Provisional application No. 60/619,219, filed on Oct. 14, 2004, provisional application No. 60/630,778, filed on Nov. 24, 2004.

(51) Int. Cl.
    *B60D 1/34* (2006.01)

(52) U.S. Cl. .................................. 280/406.1; 280/405.1
(58) Field of Classification Search ............... 280/405.1, 280/406.1, 406.2
See application file for complete search history.

(56) References Cited

U.S. PATENT DOCUMENTS

| 721,281 | A | * | 2/1903 | Broyles | 254/8 R |
| 2,402,393 | A | * | 6/1946 | Griffith | 254/29 R |
| 3,347,561 | A | * | 10/1967 | Hedgepeth | 280/406.2 |
| 3,588,145 | A | * | 6/1971 | Thompson | 280/156 |
| 4,213,627 | A | * | 7/1980 | Thompson | 280/406.2 |
| 5,415,516 | A | * | 5/1995 | Richards | 414/458 |
| 5,580,076 | A | * | 12/1996 | DeRoule et al. | 280/406.2 |

\* cited by examiner

*Primary Examiner* — Lesley Morris
*Assistant Examiner* — Wesley Potter
(74) *Attorney, Agent, or Firm* — Clayton, Howarth & Cannon, P.C.

(57) ABSTRACT

An apparatus for raising a spring arm of a trailer hitch. The apparatus may include a lift, such as a jack, for attaching to a tongue of a trailer. A link member may be pivotally attached to the lift. The link member may also be pivotally attached to a bracket which may be attached to the spring arm. A brace member may be attached to the link member on an end opposite the bracket. As the lift raises the link member, the link member may pivot about the brace member such that movement of the bracket may be amplified as compared to movement of the lift. Moreover, lifting of the spring arm can be easily accomplished.

59 Claims, 12 Drawing Sheets

FIG. 4

APPARATUS FOR RAISING A SPRING ARM ON A TRAILER HITCH

CROSS-REFERENCE TO RELATED APPLICATIONS

This application is a continuation of U.S. patent application Ser. No. 12/002,738, filed Dec. 17, 2007, which is a continuation of U.S. patent application Ser. No. 11/881,811, filed Jul. 27, 2007, which is a continuation of U.S. patent application Ser. No. 11/714,688, filed Mar. 5, 2007, which is a continuation of U.S. patent application Ser. No. 11/546,016, filed Oct. 10, 2006, which is a continuation of U.S. patent application Ser. No. 11/408,786, filed on Apr. 21, 2006, which is a continuation of U.S. patent application Ser. No. 11/251,619, filed Oct. 14, 2005, which claims the benefit of U.S. Provisional Application No. 60/619,219, filed Oct. 14, 2004, and also claims the benefit of U.S. Provisional Application No. 60/630,778, filed Nov. 24, 2004, all of which are hereby incorporated by reference herein in their entireties, including but not limited to those portions that specifically appear hereinafter, the incorporation by reference being made with the following exception: In the event that any portion of any of the above-referenced applications is inconsistent with this application, this application supercedes said portion of the above-referenced applications.

STATEMENT REGARDING FEDERALLY SPONSORED RESEARCH OR DEVELOPMENT

Not Applicable.

BACKGROUND

1. The Field of the Invention.

The present disclosure relates generally to trailer hitch devices and accessories, and more particularly, but not necessarily entirely, to a device for lifting a spring arm on a stabilizing trailer hitch.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often enhance the sway problem making driving even more stressful and difficult.

Another common problem encountered when towing a trailer is "highway hop," or the bouncing that often happens to trailers on uneven roadways. This problem may be caused by uneven weight distribution. With ordinary ball-type hitches, most of the trailer tongue-weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer. The end of the spring arms opposite the hitch head may be lifted or loaded to place an upward force on the hitch head to thereby equalize the load exerted on the trailer hitch. Other mechanisms may also be used in association with a trailer hitch to reduce side sway of the trailer. U.S. Pat. No. 3,347,561 (granted Oct. 17, 1967 to Hedgepeth) and U.S. Pat. No. 3,021,154 (granted Feb. 13, 1962 to Hedgepeth) disclose exemplary trailer hitch mechanisms known in the art for equalizing loads and reducing sway.

Despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 4 is a perspective view of a portion of a trailer hitch having an apparatus for raising a spring arm;

DETAILED DESCRIPTION

Figure 1:
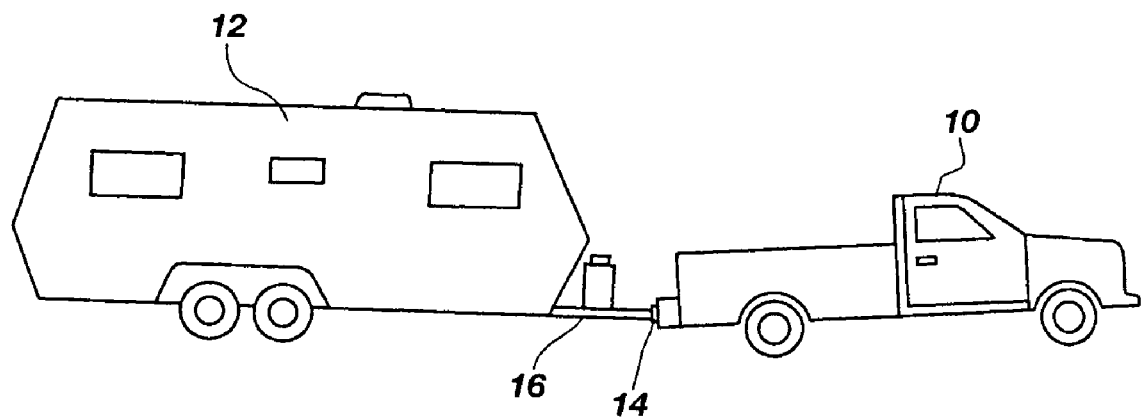
FIG. 1 is a side view of a towing vehicle towing a trailer using a trailer hitch without an equalized load.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the term "join" shall be construed broadly to include connecting or bringing members together, both in contacting engagement and non-contacting relationships.

As used herein, the term "operatively connected" shall be construed broadly to include the concept of structures that are joined together in a contacting or non-contacting relationship without any intervening structures, and situations in which structures are joined together through intervening structures in which an action on one structure causes a result on another structure through the intervening structures.

Referring now to FIG. 1, a side view is shown of a towing vehicle 10 towing a trailer 12 with a trailer hitch 14. It will be understood that the towing vehicle 10 may be any variety of vehicle known in the art, such as a car or truck, or any other variety of on-road or off-road vehicle, for example. Likewise, the principles of the present disclosure may be utilized with any variety of trailer 12 known in the art, such as camping trailers, boat trailers or cargo trailers, for example.

Figure 2:
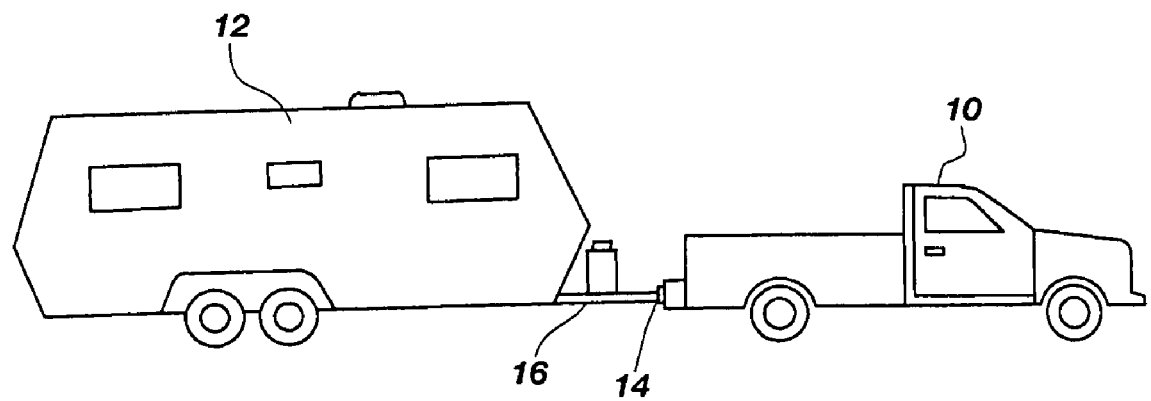
FIG. 2 is a side view of a towing vehicle towing a trailer using a trailer hitch and having an equalized load.

As shown in FIG. 1, the load from the trailer 12 may force the rear end of the towing vehicle 10 down and raise the front end of the towing vehicle 10. The uneven distribution of weight may make steering the towing vehicle 10 more difficult and may cause braking difficulties or the hitch 14 to drag on the ground. Load equalizing systems, as discussed more fully below, may be used to distribute the load created by the trailer 12 on the towing vehicle 10 to thereby make the trailer 12 and towing vehicle 10 more level, as shown in FIG. 2.

Figure 8:
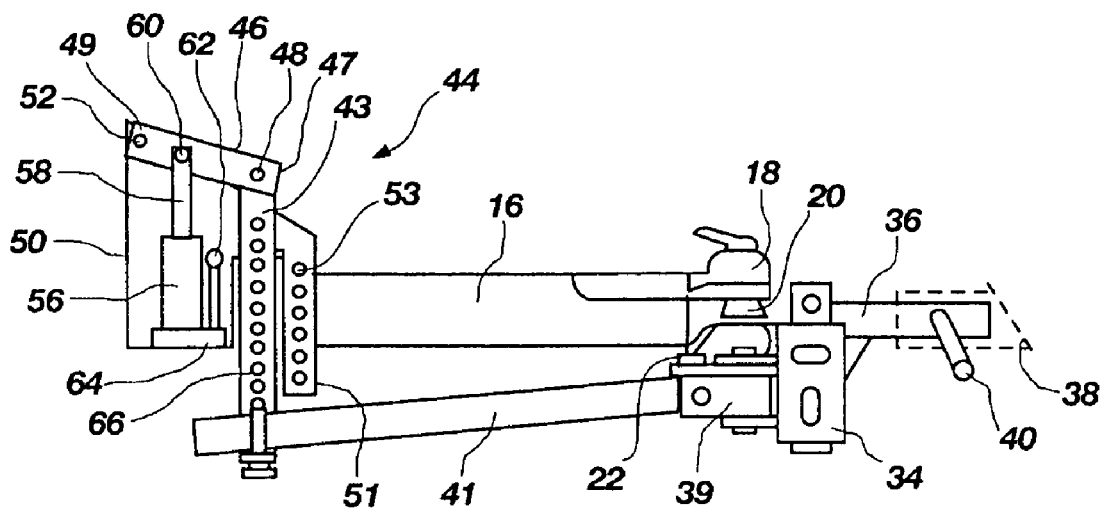
FIG. 8 is a side view of a trailer hitch having an apparatus for raising a spring arm with the spring arm in a lower, unloaded position.
Figure 9:
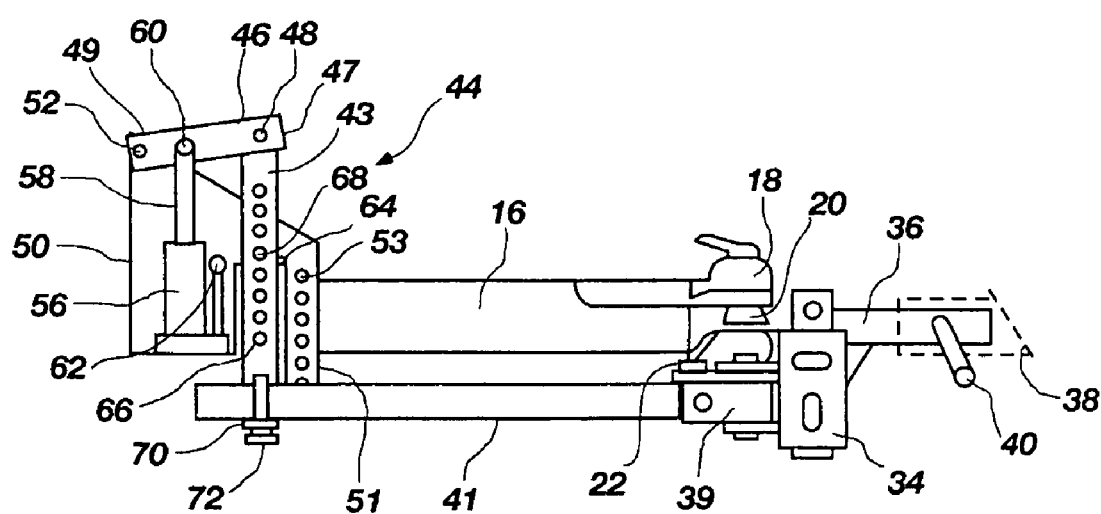
FIG. 9 is a side view of a trailer hitch having an apparatus for raising a spring arm with the spring arm in a raised, loaded position.

The trailer 12 may include a tongue 16 extending at a forward end of the trailer 12. A coupler 18, as best shown in FIGS. 8 and 9, may be located on an end of the tongue 16 for receiving a ball 20 of the hitch 14, in a manner known in the art.

Figure 3:
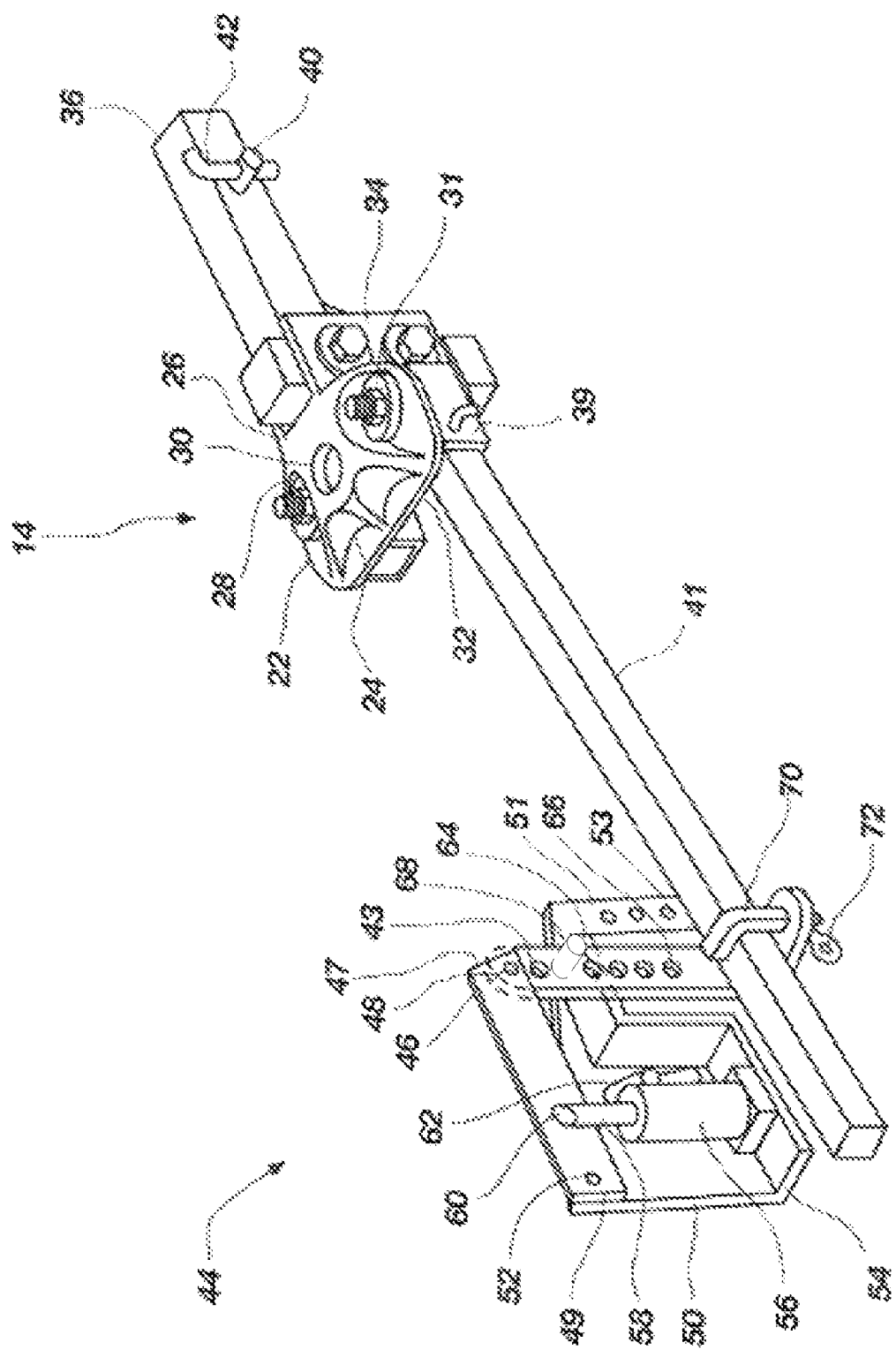
FIG. 3 is a perspective view of a portion of a trailer hitch having an apparatus for raising a spring arm.

Referring to FIG. 3, an exemplary embodiment of the hitch 14 is disclosed. It will be understood that various different types of hitches may be used within the scope of the present disclosure, including the hitch 14 disclosed in FIG. 3. The hitch 14 may include a hitch head 22. The hitch head 22 may include a front side 24 for facing the trailer 12, a back side 26 for facing the towing vehicle 10, an upper side 28 having an opening 30 for receiving a stem of a hitch ball 20, and a lower side 32. Through bores 31 may extend from the upper side 28 to the lower side 32 for receiving bolts or other fastening mechanisms to attach the hitch head 22 to other structures. The back side 26 of the hitch head 22 may include an attachment member 34 for removably attaching a hitch shank 36. The attachment member 34 may be formed of a substantially "U" shaped channel member, as viewed from above, having openings for receiving bolts or other such fasteners to attach the hitch shank 36. It will be understood that the hitch shank 36 may be attached to a vehicle receiver 38 as shown in dashed lines in FIGS. 8 and 9. An attachment mechanism such as a hitch pin 40 and a clip 42 may be used to secure the hitch shank 36 to the receiver 38.

A pair of sockets 39 may also be attached to the hitch head 22 on the lower side 32 for receiving spring arms 41. It will be understood that only a single spring arm 41 is shown in FIG. 3 for purposes of clarity. However, it will be appreciated that two spring arms 41 may be used with the hitch 14. Moreover, it will be understood that various different types of hitches may be provided in combination with the spring arms 41.

As is known in the art and discussed above, the weight of the trailer 12 may cause the back end of the towing vehicle 10 to sink and the front end of the towing vehicle 10 to raise. The spring arms 41 may be used to place an upward force on the hitch head 22 to equalize the distribution of the load and allow the towing vehicle 10 and trailer 12 to be more level. The spring arms 41 may also be beneficial for reducing sway of the trailer 12.

In one embodiment of the present disclosure, the spring arm 41 may be formed having a substantially square cross-sectional shape. Moreover, the spring arm 41 may have a uniform cross-sectional shape along its length. It will be understood, however, that the spring arm 41 may be formed of other cross-sectional shapes, such as round, rectangular, or any other shape. Additionally, the cross section of the spring arm 41 may taper along its length within the scope of the present disclosure. Another variation of the spring arm 41 may include a section that curves or arches upward on the end nearest the trailer, causing it to be biased with a corresponding rounded cam member.

An apparatus for raising or otherwise loading the spring arm 41 is shown as indicated generally at 44. A bracket 43 may be used to attach the spring arm 41 to the tongue 16 of the trailer 12. In one embodiment, the bracket 43 may have a substantial "L" shape having an upright portion for attachment to the trailer tongue 16, and a lateral portion for receiving the spring arm 41 thereupon. The bracket 43 may be of any suitable configuration for transferring forces to a spring arm

41. The bracket 43 may be configured with a convex or concave portion, or portions, for adapting to various hitch head configurations. The bracket 43 may have a bent portion that forms an angle therein that can be greater or smaller than ninety degrees, as well as exactly ninety degrees, and the phrase "L shape" as used herein shall therefore include shapes having a smaller portion extending laterally from a larger portion such that a comparison of a centerline-of-balance of the smaller portion and of the larger portion reveals that said centerlines-of-balance form an angle that is greater than forty five degrees and less than one hundred thirty five degrees. However, it will be understood that the bracket 43 may have various different shapes within the scope of the present disclosure.

In previous methods for lifting the spring arm 41, the bracket 43 was attached to the tongue 16 of the trailer 12 at a specified position where a spring arm was to be located in a raised position. A lever was joined with the lateral portion of the bracket 43 and the spring arm 41, and the lever was rotated to facilitate lifting the spring arm 41 onto the bracket 43. This method, while effective, may be difficult to accomplish for some people. The lifting apparatus 44 of the present disclosure facilitates lifting the spring arm 41 such that people with reduced strength capabilities may easily raise the spring arm 41. It will be understood, however, that the lifting apparatus 44 may be used with the prior methods of raising the spring arm 41 if so desired, such that the apparatus 44 may allow for versatile raising of the spring arm 41.

The lifting apparatus 44 may include a link member 46, also sometimes referred to herein as a first link member. The link member 46 may be configured as an elongate member having opposing ends including a first end 47 and a second end 49. It will be understood that the link member 46 may have various different shapes within the scope of the present disclosure. For example, the link member 46 may be formed as a unitary plate member. Alternatively, the link member 46 may be formed of multiple pieces joined together. Moreover, the link member 46 may be formed of various different materials, such as steel, having suitable strength and durability characteristics. The link member 46 may be attached to the bracket 43 through a first connection 48. The first connection 48 may be in the form of a pin or bolt to allow the link member 46 to be pivotally or rotatably attached to the bracket 43.

The apparatus 44 may also include a second link or brace member 50 for attachment to the link member 46 through a second connection 52. The second connection 52 may be formed similar to the first connection 48 to allow the link member 46 to be pivotally or rotatably attached to the brace 50. In one embodiment, the brace 50 may be rigidly attached to the tongue 16 of the trailer 12 such that the brace 50 may not move with respect to the trailer 12. Other embodiments of the brace 50 may be attached so as to be movable with respect to the tongue 16 of the trailer 12. It will be understood that the second link member or brace 50 may create a fulcrum for rotation of the link member 46 about the second connection 52.

In one embodiment of the present disclosure, an attachment bracket 51 may be provided to attach the apparatus 44 to the tongue 16 (shown in FIGS. 1-2) of the trailer 12. The attachment bracket 51 may be formed as a pair of plates having openings 53 for receiving fasteners therethrough. Any variety of fasteners may be used such as bolts, screws, pins, or rivets, for example. At least a portion of the attachment bracket 51 may be formed integral with, or attached to, the brace 50, and an opposing plate may be provided such that the trailer tongue 16 may be received between the plates. Fasteners may be placed through the openings 53 in the attachment bracket 51 and tightened to thereby attach the apparatus 44 to the trailer tongue 16.

It will be understood that various other attachment mechanisms may be used to attach the apparatus 44 to the tongue 16. For example, a portion of the apparatus 44 may be welded to the tongue 16 using any variety of welding techniques known to those skilled in the art. Alternatively, a "U" shaped bracket may be used, or holes may be provided in the trailer tongue 16 to bolt the apparatus directly on the tongue 16. Accordingly, the attachment bracket 51 may be formed of a single plate. Moreover, any other attachment mechanism known to those skilled in the art may be used to attach the apparatus 44 to the trailer tongue 16.

A base 54 may be positioned on a lower portion of the brace 50. The base 54 may be rigidly attached to, or integral with, the brace 50, or the base 54 may be formed as a structure separate from the brace 50. Moreover, other embodiments may be formed without a base 54. The base 54 may be configured to receive or support a lift 56 for raising or otherwise loading the spring arm 41. As used herein, the term "loading" shall be construed broadly to include applying a force to a member, regardless of the direction of the force, including situations in which the member is raised, lowered, or moved in a lateral direction. It will be appreciated that the lift 56 may include a jack, such as a hydraulic jack or a screw jack, for example. It will also be understood that any other variety of device known in the art for providing a movement force may function as a lift within the scope of the present disclosure.

The lift 56 may include a ram 58 which may be movable to allow movement of the spring arm 41. The ram 58 may be attached to the link member 46 through a third connection 60. The third connection 60 may be formed similar to the first connection 48 and the second connection 52 to allow the link member 46 to be pivotally or rotatably attached to the ram 58. In one embodiment, the third connection may be positioned on the link member 46 between the first connection 48 and the second connection 52. The lift 56 may also include an actuator 62 for use in causing movement to the ram 58. The actuator 62 may be configured for receiving a lever or tool for imparting a pumping or twisting force, for example, depending on the variety of lift, to cause the ram 58 to move.

The apparatus 44 may also include a support 64 for receiving the bracket 43 to assist in maintaining a desired position of the bracket 43. In one embodiment, the support 64 may be rigidly attached to the brace 50 and the base 54. However, it will be understood that support 64 may have various different configurations within the scope of the present disclosure, and some embodiments of the present disclosure may be provided without a support 64.

It will be understood that the bracket 43 may include a plurality of openings 66 for receiving stops 68, such as pins or bolts for example, such that when the bracket 43 is in a desired position with respect to the support 64, a stop 68 may be inserted through an opening 66 for abutting with the support 64 to maintain the bracket 43 in a desired position. It will be appreciated, however, that other embodiments of the present disclosure may be configured for use without the stops 68.

In one embodiment of the present disclosure, bracket pins 70 may be used to secure the spring arm 41 to the bracket 43. The bracket pins 70 may be substantially "L" shaped having an upright portion for being received in the bracket 43 and a lateral portion for extending over the spring arm 41. A bracket pin clip 72 may be used to fasten the bracket pin 70 to the bracket 43. Accordingly, in one embodiment, the spring arm 41 may be encompassed by either the bracket 43 or the bracket pin 70 around a majority of a circumference of the spring arm 41. Thus, the spring arm 41 may be securely held in place, and the spring arm 41 may be allowed to move with respect to the bracket 43. It will be understood that the bracket pins 70 may have various different configurations within the scope of the present disclosure and that other embodiments of the bracket 43 may be provided for use without bracket pins 70.

Figure 4:
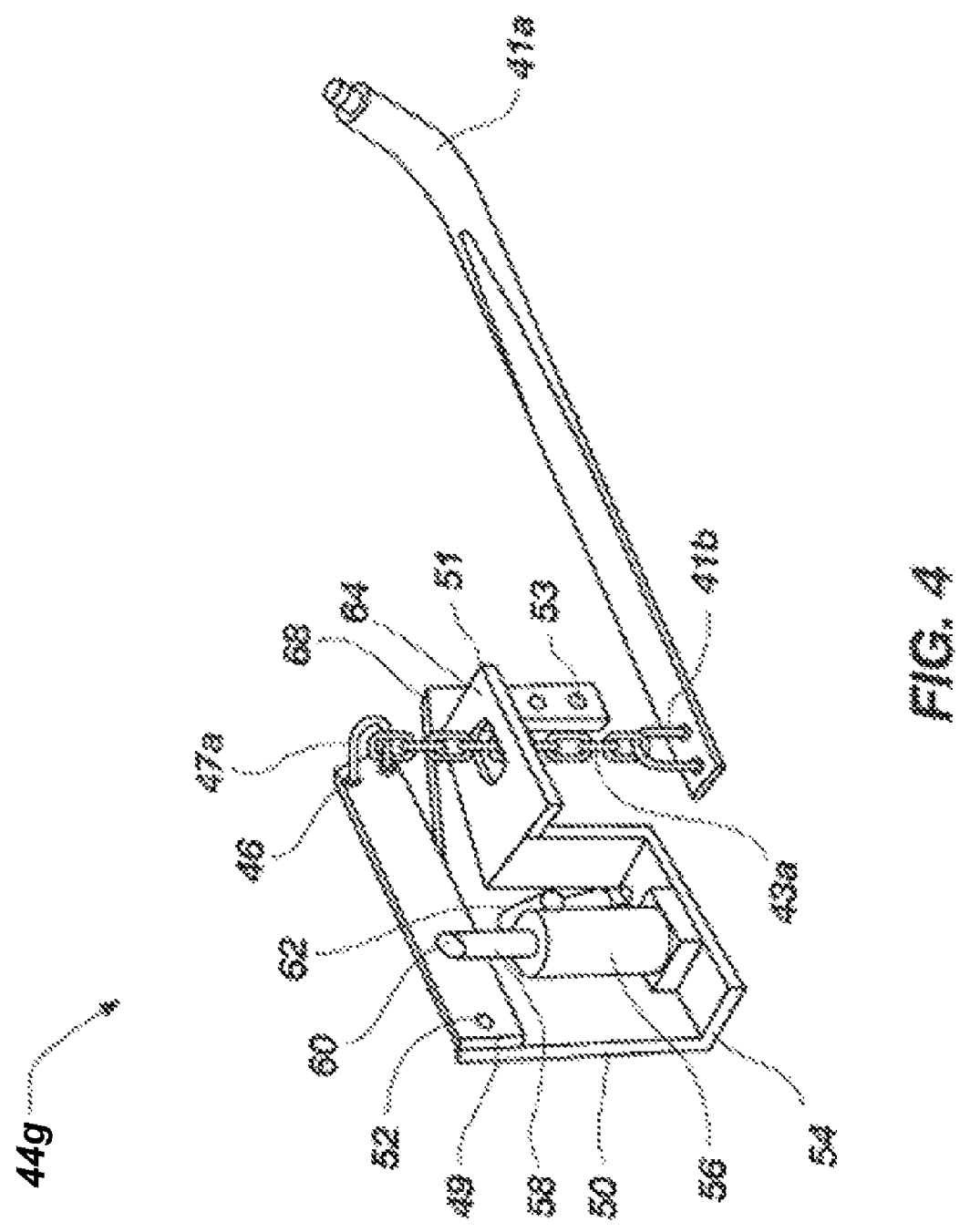

Referring to FIG. 4, an embodiment of an apparatus 44$q$ is illustrated where the bracket 43 is replaced by a flexible member 43$a$. A flexible member 43$a$ may be used to transmit forces from link member 46 to spring arm 41$a$. A biasing force from the spring arm 41$a$ may be used to keep the flexible member 43$a$ in tension and thereby substantially rigid. The flexible member 43$a$ may be a chain, cable, or other suitable medium for transmitting forces between link member 46 and spring arm 41$a$. The flexible member 43$a$ may be connected between link the member 46 and the spring arm 41$a$ by a substantially permanent or detachable attachment, by looping a portion, or link, onto connecting structures 47$a$ and 41$b$ respectively, thereby allowing ease of adjustment and maintenance. For example, when a chain is used for the flexible member 43$a$, any of the links making up the chain can be looped on to the corresponding connectors thereby adjusting the length of the flexible member 43$a$. A flexible member 43$a$ may be connected between link member 46 and various spring arm configurations by use of dedicated or universal connecting structures, thus allowing application to different configurations of hitch heads. A brace 64$a$ may help maintain the desired position of the flexible member 43$a$ by restricting the lateral movement or "pendulum effect" of the flexible member 43$a$ that the spring arm 41 may have the tendency to produce.

Figure 5:
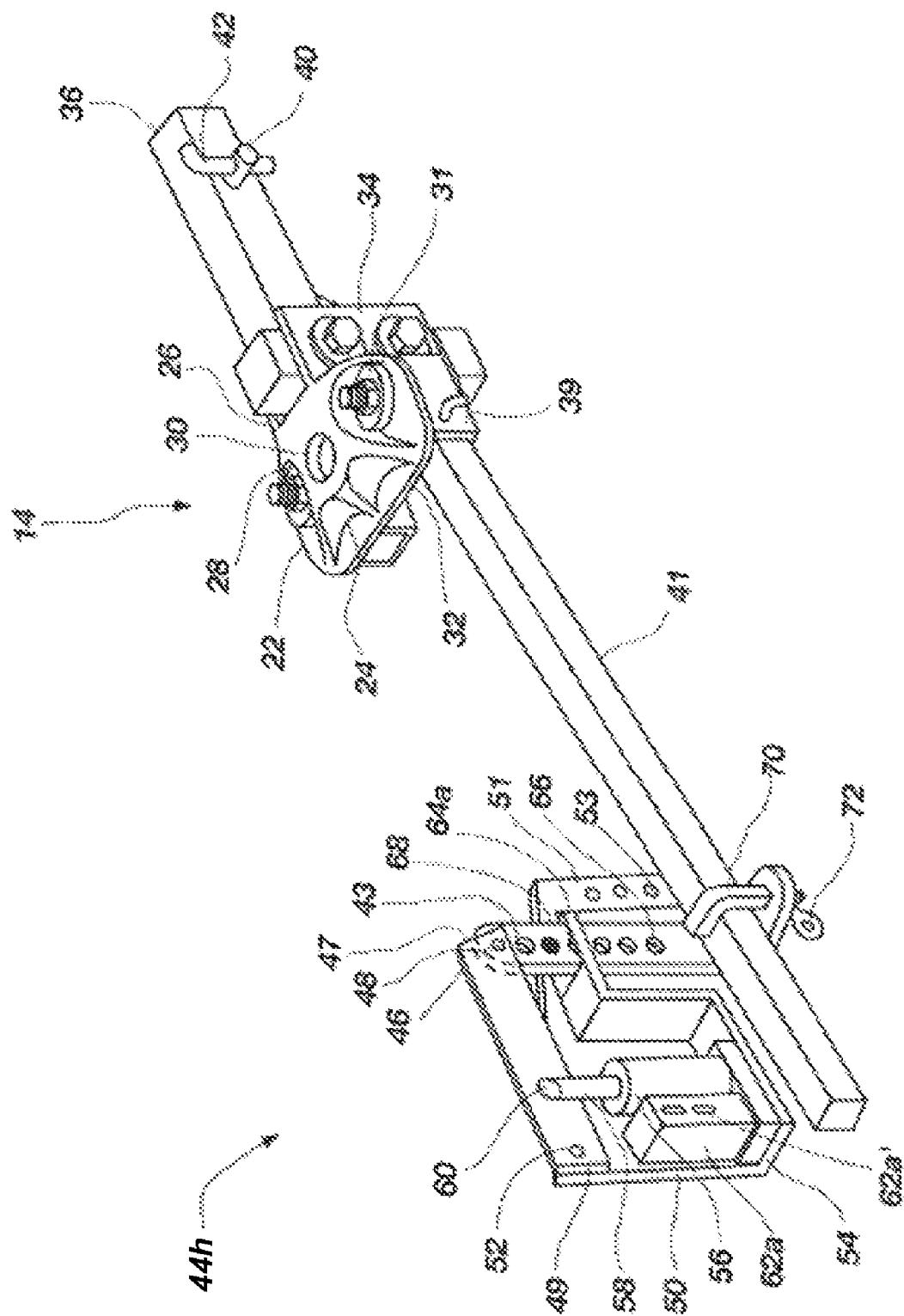
FIG. 5 is a perspective view of a portion of a trailer hitch having an apparatus for raising a spring arm.

Referring to FIG. 5, an embodiment of an apparatus 44$h$ will be described having an electric powered actuator 62$a$. A base 54 may be positioned on a lower portion of the brace 50. The base 54 may be rigidly attached to, or integral with, the brace 50, or the base 54 may be formed as a structure separate from the brace 50. Moreover, other embodiments may be formed without a base 54. The base 54 may be configured to receive or support a lift 56 for raising or otherwise loading the spring arm 41. It will be appreciated that the lift 56 may include an electric powered actuator 62$a$.

The electric powered actuator 62$a$ may be incorporated into the lift 56 or may be remotely located from the lift 56, and is in either case electrically connected to either the lift 56 or to any device known in the art for operatively coupling the actuator 62$a$ to the lift 56, such that operation of the actuator 62$a$ cause the ram 58 to move. The electric powered actuator 62$a$ for example may be an electric motor or other electromagnetic device, such as a solenoid, for example. The electric powered actuator 62$a$ may have an electronic control interface 62$a'$ for a user to interact therewith when actuating the electric powered actuator 62$a$. The electronic control interface 62$a'$ may be incorporated into the lift 56 or may be remotely located from the lift 56. The electronic control interface 62$a'$ may operate by interrupting and or completing a circuit, or by modifying the nature of a current of electricity passing there through. It will also be understood that any other variety of device known in the art for providing a movement force may function as a lift within the scope of the present disclosure.

Figure 6:
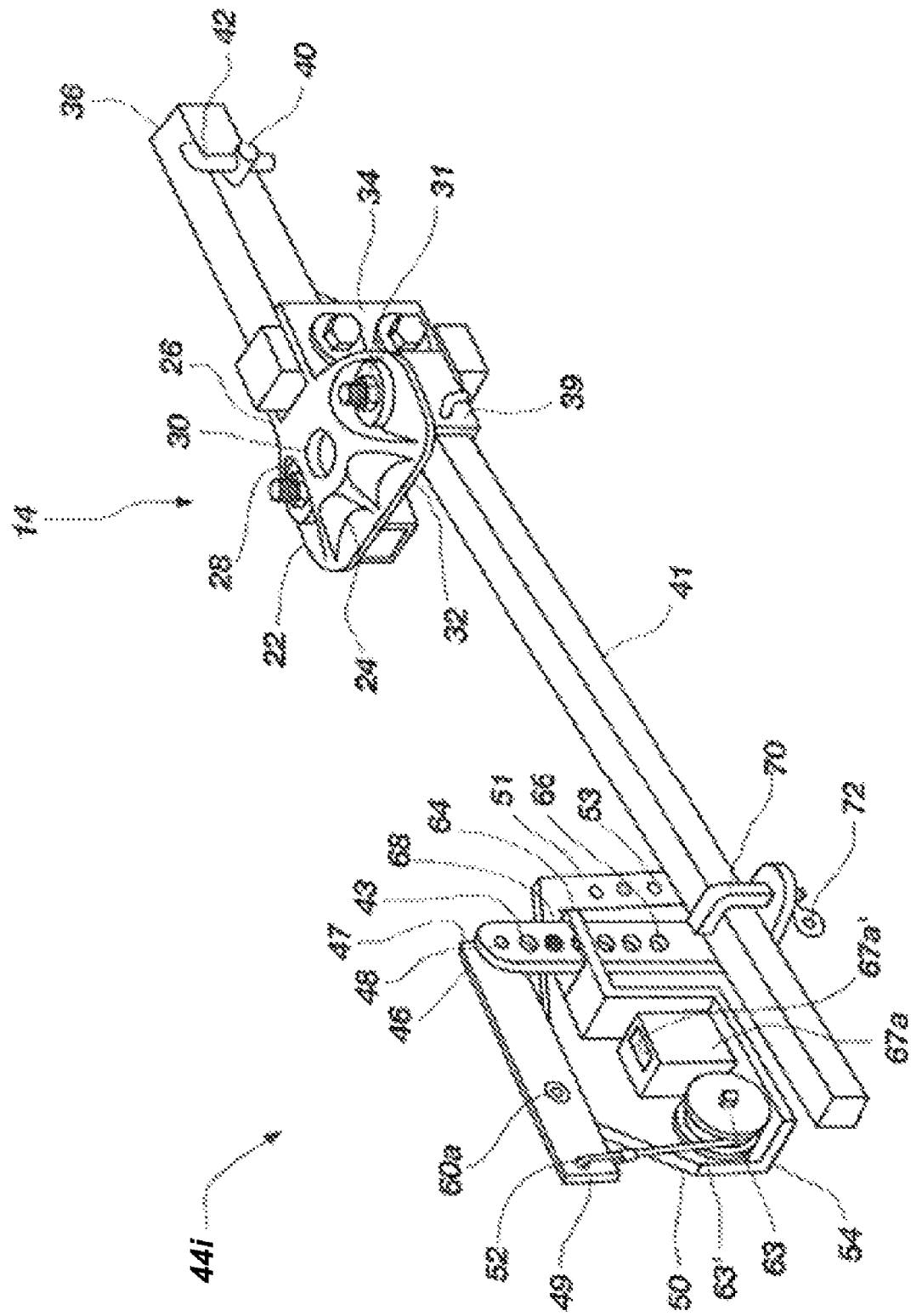
FIG. 6 is a perspective view of a portion of a trailer hitch having an apparatus for raising a spring arm.

Referring to FIG. 6, an embodiment of an apparatus 44$i$ will be described having a lift pulley 63. A base 54 may be positioned on a lower portion of the brace 50. The base 54 may be rigidly attached to, or integral with, the brace 50, or the base 54 may be formed as a structure separate from the brace 50. Moreover, other embodiments may be formed without a base 54. The base 54 may be configured to receive or support a lift pulley 63 having a corresponding cable 63' for acting on a link member 46 by raising or otherwise loading the spring arm 41. The link member 46 may have a pivot 60$a$ that is located between where the cable 63' connects to link member 46 and where the link member 46 connects with the bracket 43 thereby allowing the cable 63' to operate under tension. The pivot 60$a$ may be located to modify the loading on spring arm 41 and the rate at which a user input is transmitted into the spring arm 41.

For example, if the cable acts on link member 46 a shorter distance from the pivot 60$a$ than the bracket 43 does, a multiplier is created wherein a movement in the cable 63$a$ will result in a larger movement in the bracket 43. It will be appreciated that the lift pulley 63 may be driven by an electric powered actuator 67$a$. The electric powered actuator 67$a$ may be incorporated into the lift pulley 63 or may be remotely located from the lift pulley 63. The electric powered actuator 67$a$ for example may be an electric motor or other electromagnetic device, such as a solenoid, for example. The electric powered actuator 67$a$ may have a electronic control interface 67$a'$ for a user to interact therewith when actuating the electric powered actuator 67$a$. The electronic control interface 67$a'$ may be incorporated into the electric powered actuator 67$a$ or may be remotely located from the electric powered actuator 67$a$. The electronic control interface 67$a'$ may operate by interrupting and or completing a circuit, or by modifying the nature of a current of electricity passing there through. It will be appreciated that the lift pulley 63 may be driven manually by a user. The user may do so by use of a lever or key (not shown) to rotate the lift pulley 63. It will also be understood that any other variety of device known in the art for providing a movement force may function as a lift within the scope of the present disclosure.

Figure 7:
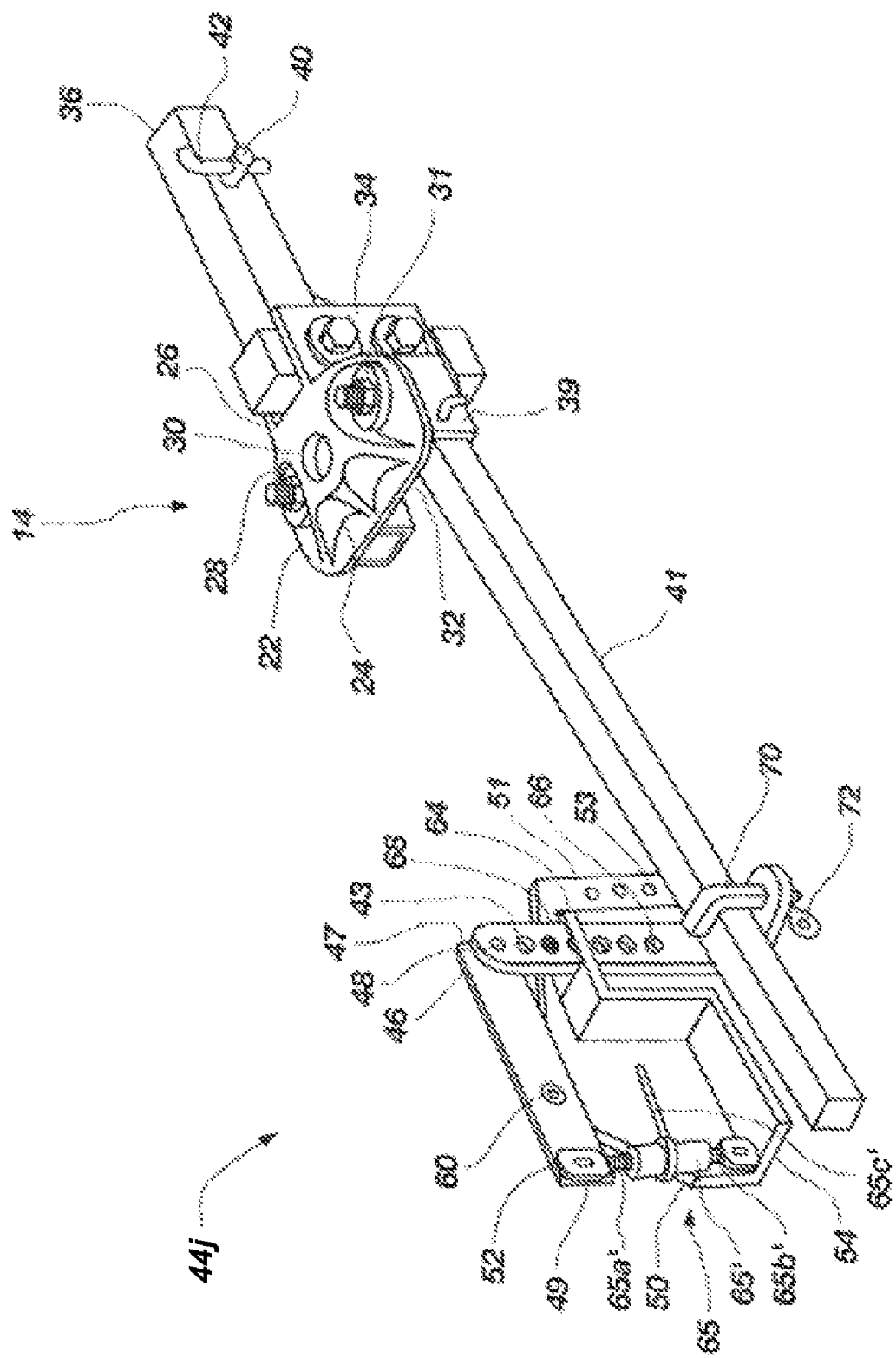
FIG. 7 is a perspective view of a portion of a trailer hitch having an apparatus for raising a spring arm.

Referring to FIG. 7, an embodiment of an apparatus 44$j$ will be described having a threaded lift device 65. A base 54 may be positioned on a lower portion of the brace 50. The base 54 may be rigidly attached to, or integral with, the brace 50, or the base 54 may be formed as a structure separate from the brace 50. Moreover, other embodiments may be formed without a base 54. The base 54 may be configured to receive or support a threaded lift device 65 having a corresponding threaded portions 65$a'$ and 65$b'$. A single threaded portion may also be used. The threaded lift device 65 may be a ratchet jack wherein the threaded portions 65$a'$ and 65$b'$ may simultaneously extend or retract by threaded screw motion from a centrally located drive body 65' by a ratcheting action on the body. There may be a lever about the mid-point of the threaded lift device 65 which extends perpendicularly from the drive body 65' of the threaded lift device 65. The lever 65$c'$ may be connected to the body through a ratcheting mechanism configured to rotate about an axis that is perpendicular to the jack.

In use, when the lever 65$c'$ is ratcheted back & forth until each threaded portions 65$a'$ and 65$b'$ has been retracted or drawn into the drive body 65' the second end 49 of the link member 46 having a mid-placed pivot 60$a$ on the link member 46, the first end 48 of the link member 46 will raise, thus lifting the bracket 43 and thereby loading the Spring Arm 41. The pivot 60$a$ may be located to modify the loading on spring arm 41 and/or the rate of loading at which a user input is transmitted into the spring arm 41. For example, if the threaded portion 65$a'$ acts on link member 46 a shorter distance from the pivot 60$a$ than the bracket 43 does, a multiplier is created wherein a movement in the threaded portion 65$a'$ will result in a larger movement in the bracket 43.

It will be appreciated that the threaded lift device 65 may be driven by an electric powered actuator. The electric powered actuator for example, may be an electric motor or other electromagnetic device. The electric powered actuator may resemble actuators 62*a* or 67*a* of FIG. 5 and FIG. 6, for example, and may have an electronic control interface for a user to interact therewith when actuating the electric powered actuator. The electronic control interface may be incorporated into the electric powered actuator or may be remotely located from the electric powered actuator. The electronic control interface may operate by interrupting and or completing a circuit, or by modifying the nature of a current of electricity passing there through. It will be appreciated that the threaded lift device 65 may be driven manually by a user. The user may do so by use of a key (not shown) or lever to rotate the drive body 65'. It will also be understood that any other variety of device known in the art for providing a movement force may function as a lift within the scope of the present disclosure.

Referring to FIGS. 8 and 9, use of the apparatus 44 will be described. The trailer tongue 16 may be joined with the trailer hitch 14 such that the coupler 18 may be attached to the ball 20. The weight of the trailer may cause the trailer hitch 14 to sink such that the trailer and the tow vehicle may not be level. The spring arm 41 may also project downwardly with respect to the trailer tongue 16. The lift 56 may therefore be placed in a lowered position as shown in FIG. 8 such that the spring arm 41 may be received in the bottom portion of the bracket 43. The actuator 62 of the lift 56 may then be manipulated to cause the ram 58 to extend and raise the link member 46, thereby lifting the bracket 43 and the spring arm 41. The apparatus 44 may be configured such that movements of the ram 58 may be magnified at the bracket 43. This may result from a greater radial distance along the link member 46 between the bracket 43 and the second connection 52 of the link member 46, as compared to the radial distance between the ram 58 and the second connection 52. Accordingly, lifting of the spring arm 41 may be quickly and easily accomplished.

As the spring arm 41 is lifted, forces may be exerted on the trailer hitch 14 to thereby cause the trailer and tow vehicle to be more level. A bracket pin 70 and bracket pin clip 72 may be installed in the bracket 43 to secure the spring arm 41 to the bracket 43, as shown in FIG. 9. Moreover, a stop 68 may be placed through an opening 66 on the bracket 43 so as to abut the support 64 to further hold the bracket 43 and spring arm 41 in place.

Figure 10:
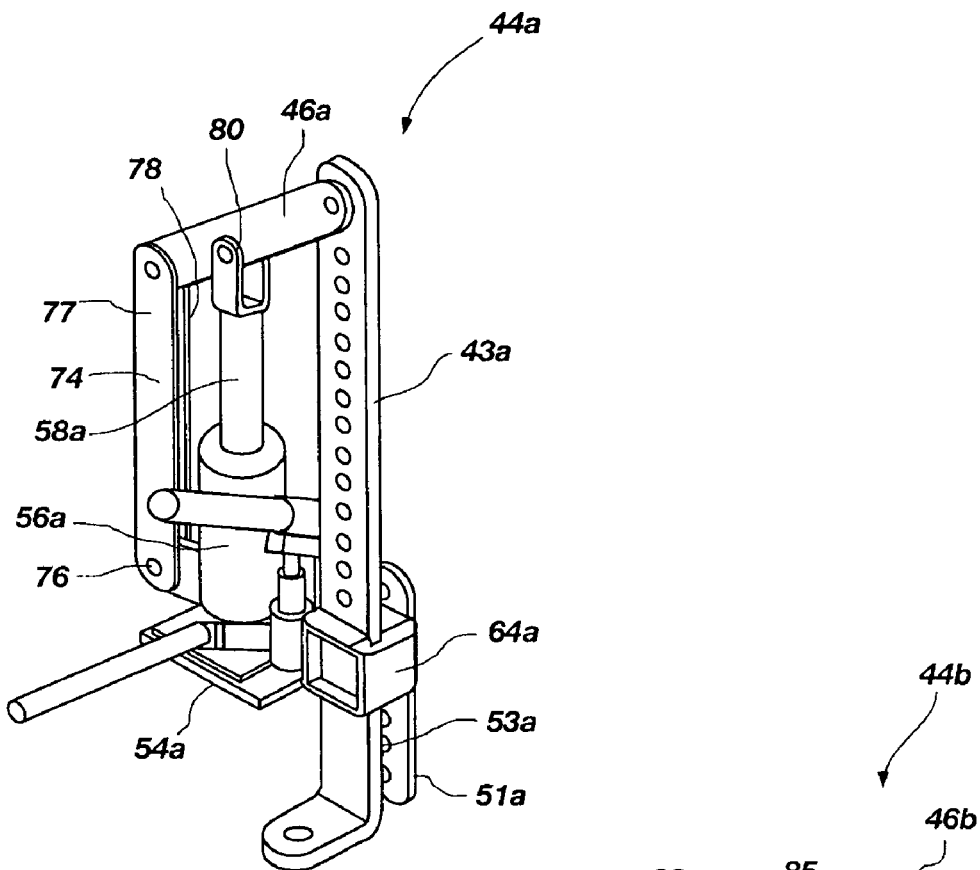
FIG. 10 is a perspective view of an alternative embodiment apparatus for raising a spring arm.

Reference will now be made to FIG. 10 to describe an alternative embodiment of the present disclosure. As previously discussed, the presently disclosed embodiments illustrated herein are merely exemplary of the possible embodiments of the disclosure, including that illustrated in FIG. 10.

It will be appreciated that the alternative embodiment illustrated in FIG. 10 contains many of the same features as represented in FIGS. 1-9, and primarily the new or different features will be explained to most succinctly explain the additional advantages which come with the embodiment of the disclosure illustrated in FIG. 10.

In the embodiment of FIG. 10, an apparatus 44*a* may be provided with a second link member 74 that may be moveable, as an alternative to the fixed brace member 50 as discussed in the previously disclosed embodiment. The second link member 74 may have a pivotal connection 76 to allow the second link member 74 to rotate. Rotation of the second link member 74 may allow lifting forces to be applied to the bracket 43*a* such that less torque may be applied to the bracket 43*a*, thereby facilitating lifting of the bracket 43*a* without binding. As the ram 58*a* is raised, the second link member 74 may be caused to rotate toward the lift 56*a*, whereas the bracket 43*a* may be constrained against excessive rotation by the support 64*a*.

Also, in one embodiment, the second link member 74 may be formed having a first side member 77 and a second side member 78 for receiving the link member 46*a* therebetween. Other embodiments of the second link member 74 may be formed as a single piece member. Moreover, it will be understood that one embodiment of the present disclosure may be arranged such that the second link member 74, the lift 56*a* and the bracket 43*a* may be positioned side by side in a direction configured to extend along a length of the spring arm 41. The lift 56*a* may be positioned between the second link 74 and the bracket 43*a*. However, other arrangements of the lift 56*a*, second link 74, and bracket 43*a* may be used, such as wherein the second link 74 is positioned between the bracket 43*a* and the lift 56*a*, for example.

The apparatus 44*a* may also include an adaptor 80 for connecting the link member 46*a* to the ram 58*a*. The adaptor 80 may be double pronged, or have a single prong for receiving the link member 46*a* and for providing clearance such that the link member 46*a* may move without contacting the adaptor 80. Various other connecting devices may be used to connect the link member 46*a* to the ram 58*a* in addition to, or instead of, the adaptor 80. Link member 46*a* may have a socket (not shown) that accepts a corresponding structure on the ram 58*a*. It will be understood that the alternative apparatus 44*a* may be operated in a manner similar to that discussed above with regard to the apparatus 44.

Figure 11:
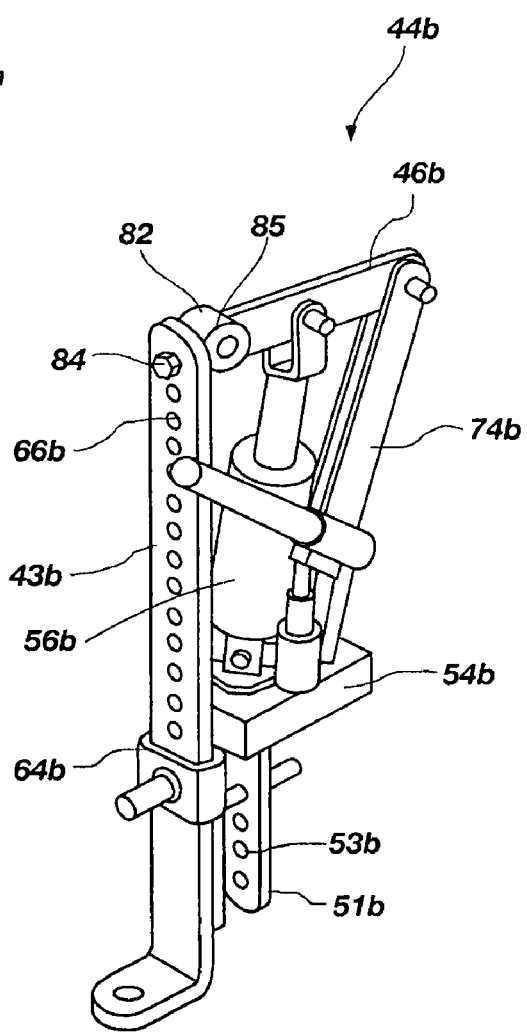
FIG. 11 is a perspective view of an additional alternative embodiment apparatus for raising a spring arm.

Reference will now be made to FIG. 11 to describe an additional alternative embodiment of the present disclosure. As previously discussed, the presently disclosed embodiments illustrated herein are merely exemplary of the possible embodiments of the disclosure, including that illustrated in FIG. 11.

It will be appreciated that the alternative embodiment illustrated in FIG. 11 contains many of the same features as represented in FIGS. 1-10, and primarily the new or different features will be explained to most succinctly describe the additional advantages which come with the embodiment of the disclosure illustrated in FIG. 11.

The embodiment of the disclosure depicted in FIG. 11 may include an apparatus 44*b* in which a lift 56*b*, and second link member 74*b* may be positioned substantially in alignment behind the bracket 43*b*, as viewed from a side of the trailer. In other words, the second link member 74*b*, the lift 56*b*, and the bracket 43*b* may be positioned in alignment in a direction configured to extend crosswise with respect to the spring arm 41. This arrangement may be beneficial for use with trailer tongues having diminished space along a length of the tongue.

A connector 82 may be provided to connect the link member 46*b* to the bracket 43*b*. The connector 82 may include a stem portion 84 for being received in an opening 66*b* in the bracket 43*b*, and a joining portion 85 for being connected to the link member 46*b*. The joining portion may form a fork for placement on both sides of the link member 46*b*, and for receiving a pin for attaching the connector 82 to the link member 46*b*. It will be understood that various other connecting devices known to those skilled in the art may be used as an alternative to the connector 82 within the scope of the present disclosure.

It will be understood that the embodiment disclosed in FIG. 11 may include a moveable second link member 74*b*, or alternatively, a non moveable brace member may be used as discussed in the previously disclosed embodiments. Also, the lift 56*b* may be attached to the base 54*b* to allow the lift 56*b* to rotate with respect to the base 54*b*. The rotating lift 56*b* may allow further reduction of torque applied to the bracket 43b as the bracket 43b is moved. Moreover, the arrangement of the second link member 74b, the lift 56b, and the bracket 43b may be varied within the scope of the present disclosure.

Figure 12:
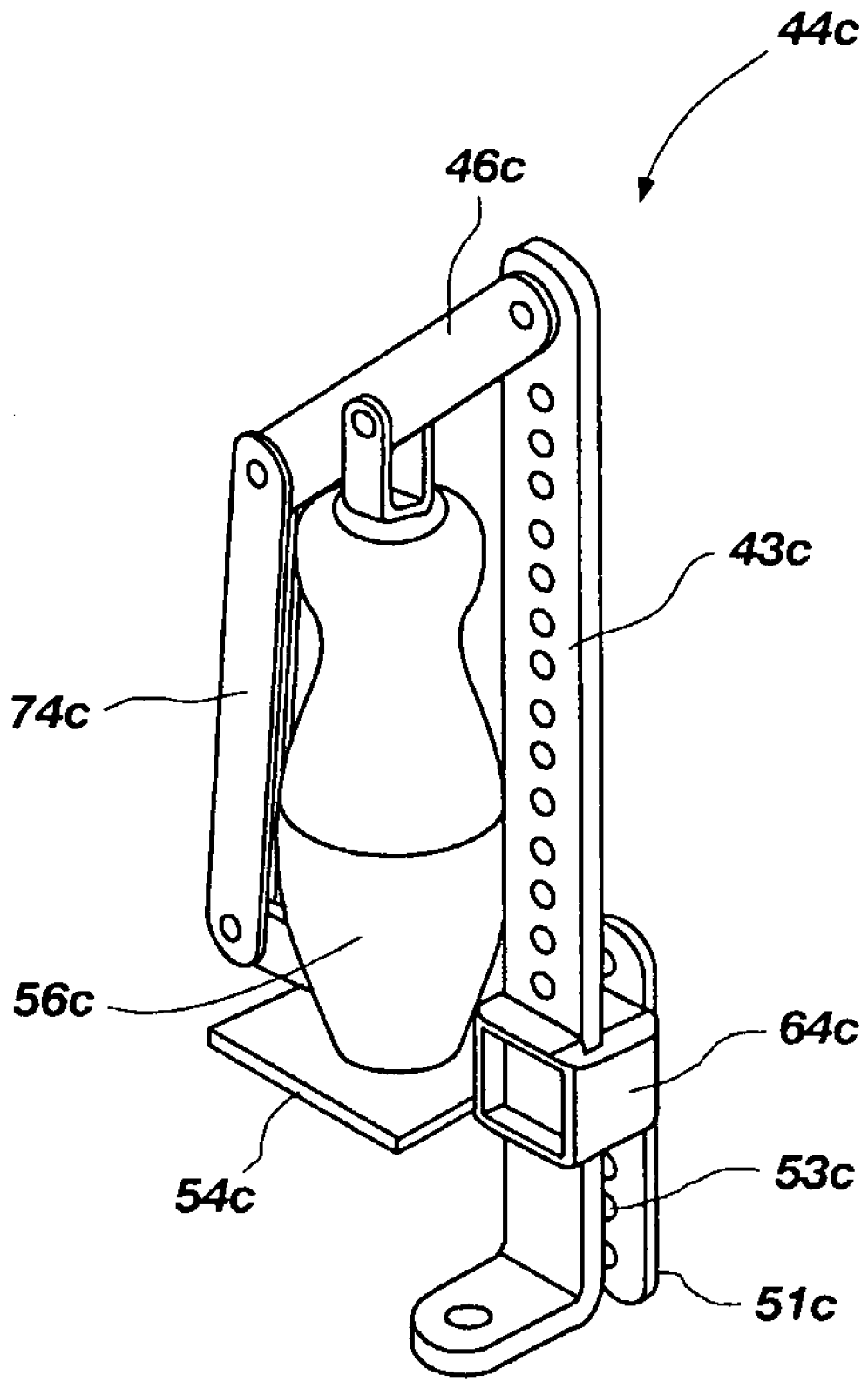
FIG. 12 is a perspective view of a further alternative embodiment apparatus for raising a spring arm.

Reference will now to made to FIG. 12 to describe a further alternative embodiment of the present disclosure. As previously discussed, the presently disclosed embodiments illustrated herein are merely exemplary of the possible embodiments of the disclosure, including that illustrated in FIG. 12.

It will be appreciated that the alternative embodiment illustrated in FIG. 12 contains many of the same features as represented in FIGS. 1-11, and primarily the new or different features will be explained to most succinctly describe the additional advantages which come with the embodiment of the disclosure illustrated in FIG. 12.

FIG. 12 includes an apparatus 44c similar to that disclosed in FIG. 10, except that the lift 56c may be formed as an inflatable device. The lift 56c may be attached to a pump such that when the pump is activated, at least a portion of the lift 56c may be inflated automatically to cause the link member 46c to be raised. It will also be appreciated that the lift 56c may also function as a shock absorber to allow movement of the bracket 43c while the lift 56c is in an inflated or raised condition. Accordingly, at least a portion of the lift 56c may be formed with an elastic or resilient material to allow the lift 56c to flex to absorb movement of the bracket 43c. It will also be understood that an automatic actuator, such as a pump or motor, for example, may be used with other embodiments of the raising apparatus disclosed herein. For example, a hydraulic pump may be automatically activated to raise the lift 56. Alternatively, a motor may be provided to create a torque for moving a lift 56 of a screw type variety. Accordingly, any variety of automatic lifting devices may be used in association with the present disclosure, such that manual manipulation of the lift 56 may be avoided.

It will also be understood that various types of resilient devices may be used in association with the lifting apparatus disclosed herein. For example, springs may be provided on the lifts used in connection with the embodiments of the present disclosure to further function as a shock absorber.

Figure 13:
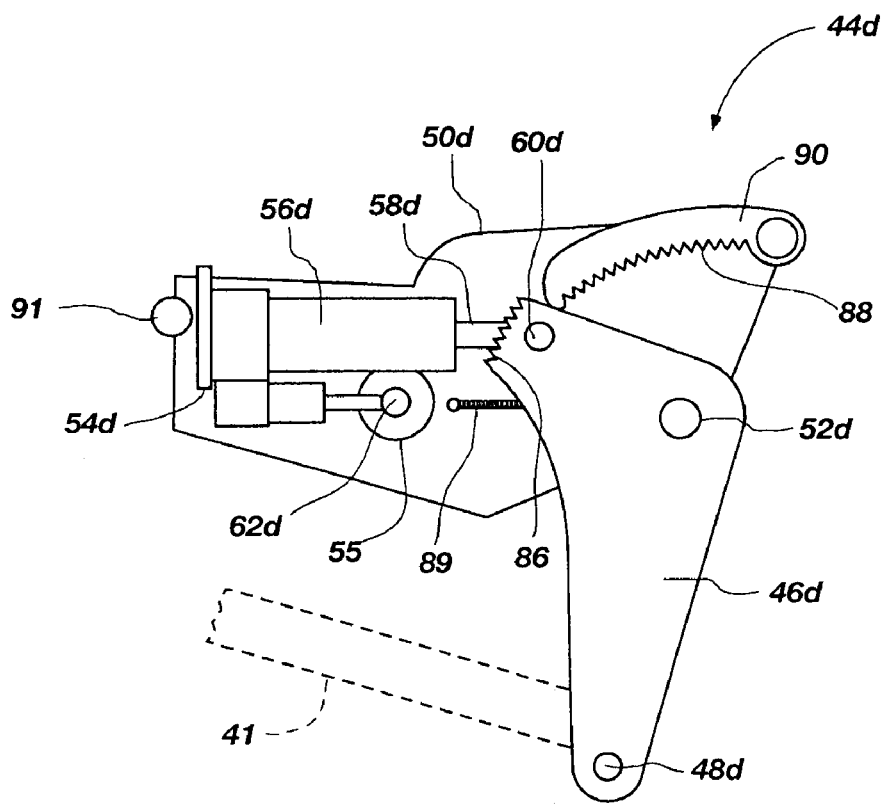
FIG. 13 is a side view of another alternative embodiment apparatus for raising a spring arm, in which the apparatus is in a lowered position.

Reference will now to made to FIG. 13 to describe an additional alternative embodiment of the present disclosure. As previously discussed, the presently disclosed embodiments illustrated herein are merely exemplary of the possible embodiments of the disclosure, including that illustrated in FIG. 13.

It will be appreciated that the alternative embodiment illustrated in FIG. 13 contains many of the same features as represented in FIGS. 1-12, and primarily the new or different features will be explained to most succinctly describe the additional advantages which come with the embodiment of the disclosure illustrated in FIG. 13.

FIG. 13 illustrates an apparatus 44d for raising a spring arm 41 (shown in dashed lines). The apparatus 44d may include a lift 56d that may be oriented along a length of the trailer tongue 16 in a substantially lateral configuration. In other words, the lift 56d may extend substantially in a direction along a length of the spring arm 41. Accordingly, it will be understood that the lift 56d may be rotated by approximately ninety degrees from the orientation of the previously described embodiments in FIGS. 3-12, in which the lift may be configured to extend in a direction crosswise with respect to the spring arm 41. The apparatus 44d may include a brace 50d for supporting the lift 56d and for attaching the apparatus 44d to the trailer tongue 16. It will be understood that the brace 50d may have a variety of shapes and configurations within the scope of the present disclosure, and the brace 50d may be fixedly or movably attached to the trailer tongue 16. Moreover, the brace 50d may be provided with features such as gaps 55 for accommodating various structures, such as the actuator 62d.

The apparatus 44d may include a link member 46d that may include a first connection 48d for receiving the spring arm 41 for raising or loading the spring arm 41. The first connection 48d may be in the form of a pin for allowing the spring arm 41 to slide with respect to the first connection 48d. Accordingly, the first connection 48d may be removably joined to the spring arm 41 such that the first connection 48d may support the spring arm 41 by abutting with the spring arm 41, but the spring arm 41 may be allowed to move with respect to the connection 48d. It will be understood that some embodiments may include intervening structures between the spring arm 41 and the link member 46d, whereas other embodiments may be arranged such that the spring arm 41 directly joins the connection 48d on the link member 46d. Other embodiments of the connection 48d may be formed integrally with the link member 46d.

Figure 14:
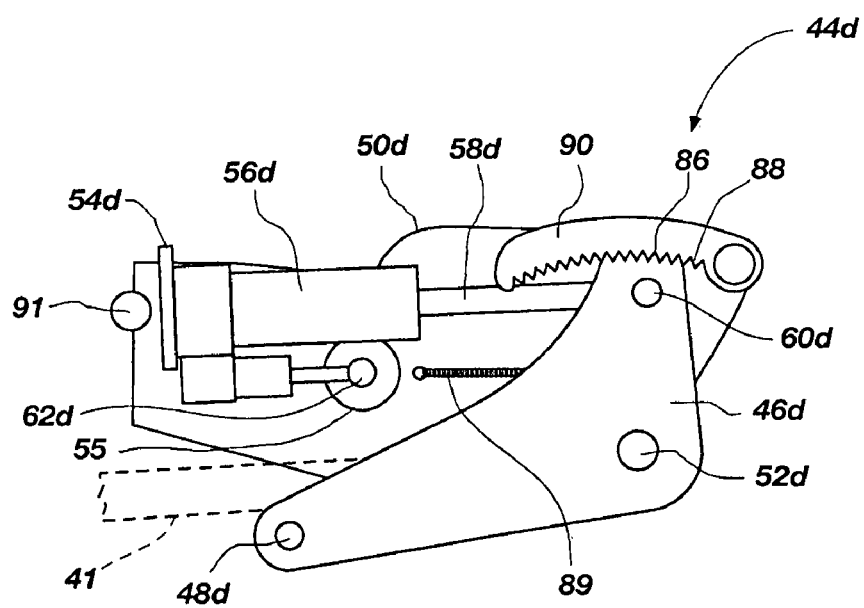
FIG. 14 is a side view of the embodiment of FIG. 13 in which the apparatus is in a raised position.

A second connection 52d may be used to attach the link member 46d to the brace 50d or the trailer tongue 16. The second connection 52d may include a pivotal connection to allow the link member 46 to rotate about the second connection 52d. Moreover, a third connection 60d may be provided for attaching the link member 46d to a ram 58d of the lift 56d. Accordingly, as the ram 58d is extended, the link member 46d may rotate with respect to the ram 58d, and with respect to the second connection 52d, to travel from a lowered position as shown in FIG. 13, to a raised position as shown in FIG. 14. It will be understood that some embodiments of the present disclosure may include a biasing member 89 or spring, to bias the link member 46d in a specified direction, though other embodiments may be formed without the biasing member 89.

Teeth 86 may be formed on an edge of the link member 46d. The teeth 86 may be configured to mate with corresponding teeth 88 on a detent member 90. The detent member 90 may be pivotally attached to the brace 50d, and the detent member 90 may be biased to contact the link member 46d through a spring or other biasing member (not shown). It will be understood that some embodiments may not include a biasing member. It will also be understood that the teeth 86 on the link member 46d may be configured to engage with the corresponding teeth 88 on the detent member 90, such that movement of the link member 46d toward the extended position may be allowed. However, engagement between the teeth 86 on the link member 46d and the corresponding teeth 88 on the detent member 90 may assist in holding the link member 46d to prevent the link member 46d from moving to the lowered position. The detent member 90 may be lifted off the link member 46d in a manner known in the art, to allow the link member 46d to be returned to the lowered position, as shown in FIG. 13.

Figure 15:
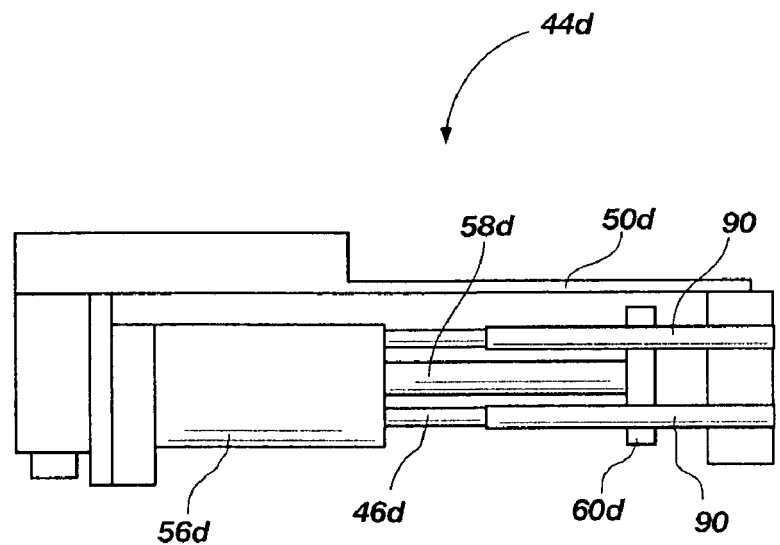
FIG. 15 is a top view of the apparatus of FIG. 14.

As shown most clearly in FIG. 15, which shows a top view of the apparatus 44d, a pair of detents 90 and a pair of link members 46d may be provided. Accordingly, the ram 58d may be configured to extend between the link members 46 and the detents 90. Similarly, the pair of link members 46d may be configured to receive the spring arm 41 therebetween. It will be appreciated, however, that other embodiments of the present disclosure may be configured such that only a single link member 46 and detent 90 may be provided.

The lift 56d may be supported on a base 54d that may be supported by a lift pivot 91. Alternatively, the lift 56d may be supported directly on the lift pivot 90. The base 54d and the lift 56d may be allowed to rotate about the lift pivot 91 to adjust a direction of extension of the ram 58d. It will be understood that the connection 60d between the ram 58d and the link member 46d may travel about an arcuate path about the connection 52d. The arcuate travel of the connection 60d may also require that the lift 56d be rotated as ram 58d is extended and retracted so that the connection 60d may be allowed to follow the arcuate path about the connection 52d.

Figure 16:
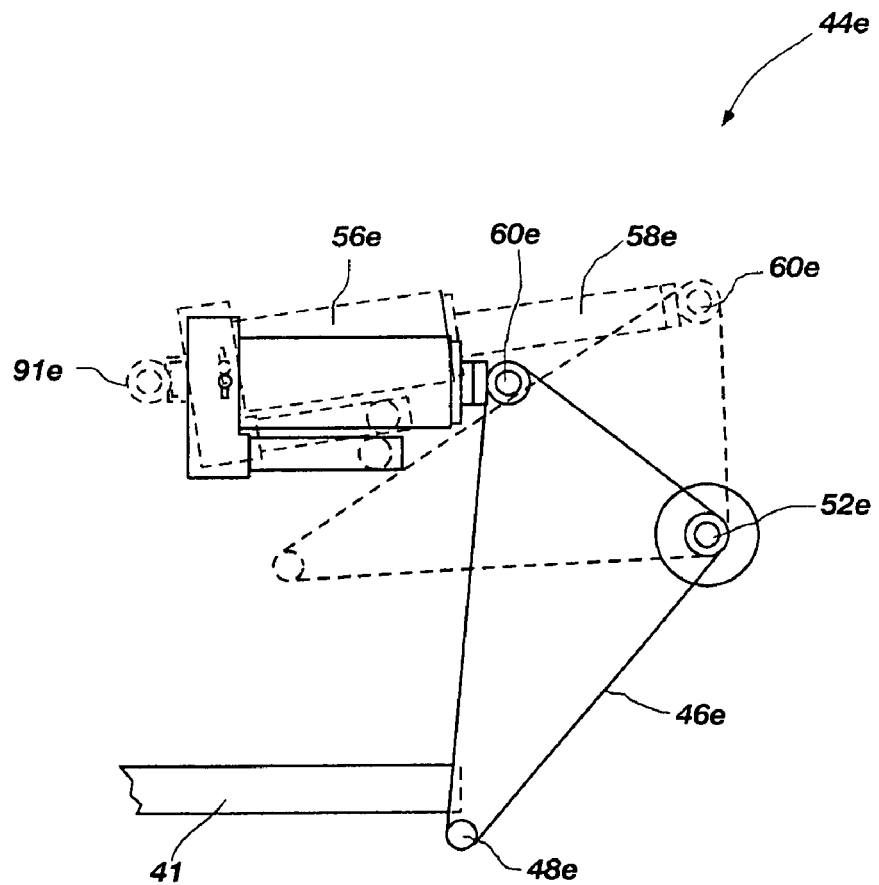
FIG. 16 is a side view of an additional alternative embodiment apparatus, in which the apparatus is shown in dashed lines in a raised position.

Rotation of the lift 56 may be described more clearly with reference to FIG. 16, which shows a side view of yet an additional alternative embodiment apparatus 44e, and a break away portion of the spring arm 41. It will be understood that the embodiment of FIG. 16 is merely exemplary of the possible embodiments of the disclosure, as are the other embodiments disclosed herein. Moreover, it will be appreciated that the alternative embodiment illustrated in FIG. 16 contains many of the same features as represented in FIGS. 1-15. Accordingly, only the new or different features will be explained to most succinctly explain the additional advantages which come with the embodiment of the disclosure illustrated in FIG. 16.

FIG. 16 illustrates an apparatus similar to that disclosed in FIGS. 9-15, except that the detent 90 has been omitted. Moreover, the first link member 46e may be shaped differently and may not include the teeth 86. As shown in solid lines, the lift 56e may be oriented in a first direction when the first link member 46e is in a lowered position. As the link member 46e is moved to a raised position, as shown in dashed lines in FIG. 16, the lift 56e may be rotated about the lift pivot 91e to extend in a second direction. It will be understood that the lift 56e may be rotated about the lift pivot 91e to extend in an infinite number of directions to accommodate the position of the connection 60e as it rotates about the connection 52e.

The embodiment of FIG. 16 may be configured such that a distance between the first connection 48e and the second connection 52e may be greater than a distance between the second connection 52e and the third connection 60e. Accordingly, as the ram 58e moves the third connection 60e through a distance, the first connection 48e may be allowed to move the spring arm 41 through a greater distance. Accordingly, the first link 46e may be configured to provide amplified movement of the spring arm 41 such that the spring arm 41 may be raised into position in a quick and efficient manner. It will be understood that the concepts disclosed in connection with the embodiment of FIG. 16 may be used in combination with the other embodiments disclosed herein.

Figure 17:
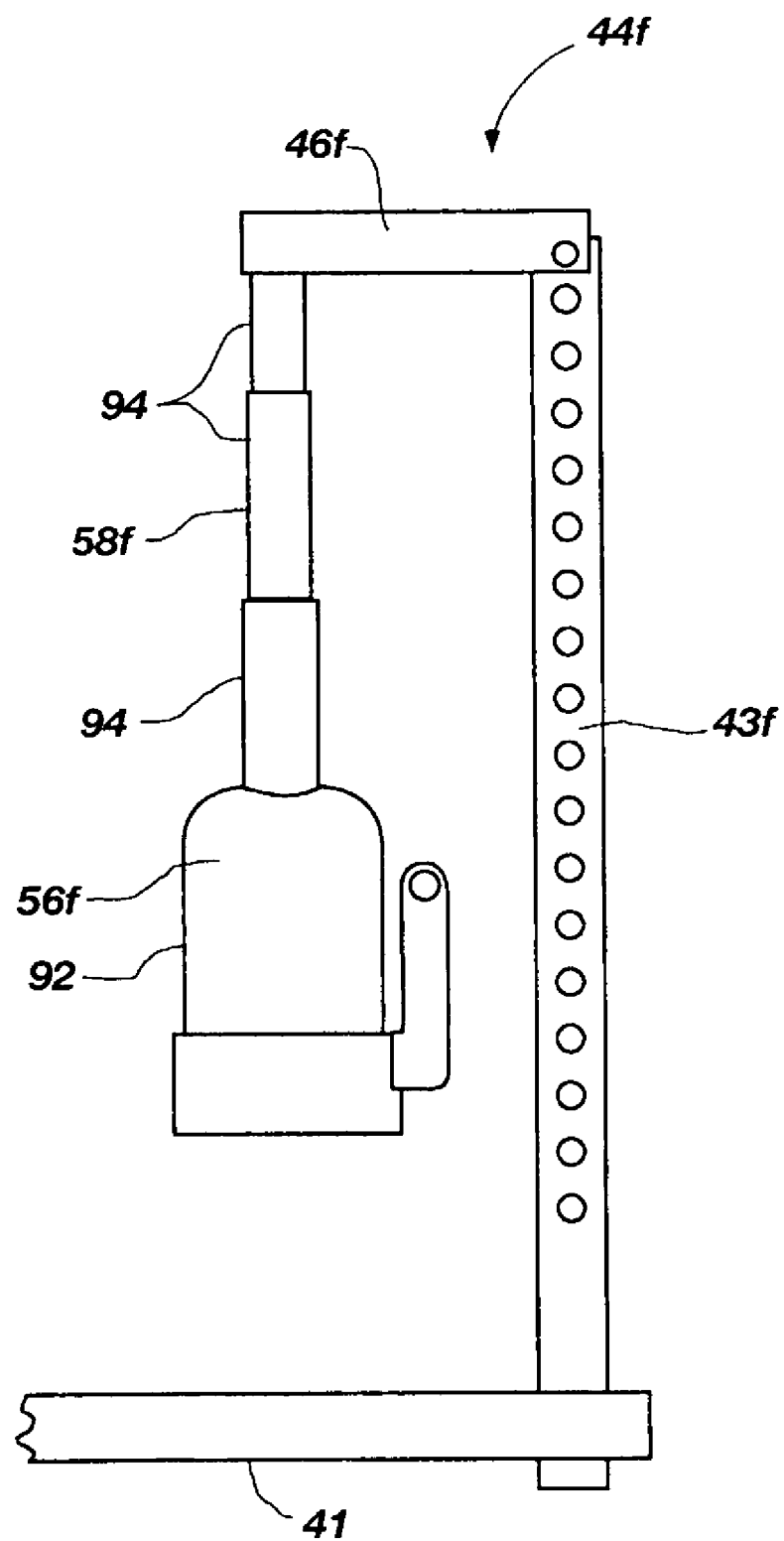
FIG. 17 is a side view of an exemplary embodiment telescoping lift for use with an apparatus in accordance with the principles of the present disclosure.

Referring now to FIG. 17, a side view is shown of an additional alternative embodiment apparatus of the present disclosure, indicated generally at 44f, and a break away portion of a spring arm 41. Similar to the other embodiments disclosed herein, it will be understood that the embodiment of FIG. 17 is merely exemplary of the possible embodiments of the disclosure. Moreover, it will be appreciated that the alternative embodiment illustrated in FIG. 17 contains many of the same features as represented in FIGS. 1-16. Accordingly, only the new or different features will be explained to most succinctly describe the additional advantages which come with the embodiment of the disclosure illustrated in FIG. 17.

As shown most clearly in FIG. 17, embodiments of the present disclosure may include a multi-stage or telescoping lift 56f, as an alternative to the lift 56-56e discussed above. The telescoping lift 56f may be formed in any manner known to those skilled in the art. For example, the telescoping lift 56f may include an outer housing or cylinder 92, and a ram 58f formed of a plurality of coaxial elements 94 mountable within the housing 92. It will be understood that the telescoping lift 56f may include any number of coaxial elements 94 such as two, three, or more, for example. The distance the coaxial elements 94 may be capable of lifting an object may be greater than the height of the housing 92. Moreover, the telescoping lift 56f may facilitate movement of the spring arm 41 through larger distances than a single stage lift or any one of the coaxial elements 94.

It will be understood that one embodiment of the present disclosure may include a link member 46f for attaching the telescoping lift 56f to the bracket 43f, or other such lifting structure. The link member 46f may be rigidly attached to the ram 58f such that the link member 46f may not move with respect to the ram 58f. Accordingly, the link member 46f may be integral with the bracket 43f, or the link member 46f may be attached to the bracket 43f by welding or by using fasteners such as bolts or pins, for example. Alternatively, the link member 46f may be adjustably attached to the ram 58f such that the link member 46f may be allowed to move with respect to the ram 58f. The link member 46f may be formed as a bar or plate member, or the link member 46f may have various different shapes and configurations within the scope of the present disclosure. It will be understood that the link member 46f may be joined to the bracket 43f in various different locations or orientations such that raising of the ram 58f lifts the bracket 43f and the spring arm 41. Also, the position of the lift 56f with respect to the bracket 43f may be varied to be located in any desired position. Moreover, it will be understood that movement of the bracket 43f, and thus the spring arm 41, may be amplified with respect to movement of any one of the coaxial elements 94.

It will be understood that each of the components of the present disclosure may be constructed of materials known in the art, having suitable strength and durability characteristics. Moreover, any suitable manufacturing method known in the art may be used in constructing the features of the present disclosure.

It will be appreciated that the structure and apparatus disclosed herein is merely one example of a means for amplifying movement of the lift, and it should be appreciated that any structure, apparatus or system for amplifying movement of the lift which performs functions the same as, or equivalent to, those disclosed herein are intended to fall within the scope of a means for amplifying movement of the lift, including those structures, apparatus or systems for amplifying movement of the lift which are presently known, or which may become available in the future. Anything which functions the same as, or equivalently to, a means for amplifying movement of the lift falls within the scope of this element.

In accordance with the features and combinations described above, a useful method of lifting a spring arm on a towing hitch includes the steps of:
 (a) joining a lift to said towing hitch;
 (b) joining a bracket to said spring arm;
 (c) raising said lift to thereby raise said spring arm; and
 (d) amplifying movement of said bracket with respect to movement of said lift.

In accordance with the features and combinations described above, another useful method of lifting a spring arm on a towing hitch includes the steps of:
 (a) joining a link member to said towing hitch;
 (b) joining said link member to a rigid bracket member;
 (c) joining said bracket member to said spring arm; and
 (d) rotating said link member to thereby lift said spring arm.

Those having ordinary skill in the relevant art will appreciate the advantages provide by the features of the present disclosure. For example, it is a feature of the present disclosure to provide an apparatus for raising a spring arm on a trailer hitch which is simple in design, manufacture and use. Another feature of the present disclosure is to provide such an apparatus that reduces the effort required to lift a spring arm. It is a further feature of the present disclosure, in accordance with one aspect thereof, to provide an apparatus for raising a spring arm that allows the spring arm to be used to reduce sway of the trailer. It is another feature of one embodiment of the present disclosure, to provide an apparatus that allows raising of spring arms in a manner that provides shock absorption to the spring arms. It is an additional feature of the present disclosure to provide an apparatus for raising a spring arm that allows movement of a lift device to be amplified such that a greater lift of the spring arm may be achieved.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for loading a spring arm of a towing hitch, said apparatus comprising:
   a bracket for attaching to said spring arm;
   a lift for lifting said bracket; and
   a link member pivotally connected to said bracket and said lift, such that movement of said lift is transferred to said bracket through said link member;
   wherein said link member is pivotally attached to a second link member such that movement of said link member by said lift produces an amplified movement of said bracket.

2. The apparatus of claim 1, wherein said second link member comprises a pivotal connection to allow said second link member to rotate.

3. The apparatus of claim 1, wherein said second link member is non-rotatably fixed to a base.

4. The apparatus of claim 1, wherein said lift is supported on a base.

5. The apparatus of claim 1, wherein said bracket comprises a plurality of openings for receiving a stop to maintain the bracket in position.

6. The apparatus of claim 1, wherein said bracket further comprises a bracket pin and a bracket pin clip for securing the spring arm to the bracket.

7. The apparatus of claim 1, further comprising a support for receiving the bracket.

8. The apparatus of claim 1, wherein said lift is an inflatable device such that said lift is configured to function as a shock absorber.

9. The apparatus of claim 1, wherein said lift is configured to extend in a direction crosswise with respect to said spring arm.

10. The apparatus of claim 1, further comprising a second link member, and wherein said second link member, said lift, and said bracket are positioned side by side in a direction configured to extend along a length of said spring arm.

11. The apparatus of claim 1, further comprising a second link member, and wherein said second link member, said lift, and said bracket are positioned in alignment in a direction configured to extend crosswise with respect to said spring arm.

12. The apparatus of claim 1, wherein the lift is rotatable about a lift pivot.

13. The apparatus of claim 1, wherein the link member comprises an elongate member having opposing ends, wherein said link member is attached to said bracket through a first connection, and said link member is attached to a second link member through a second connection.

14. The apparatus of claim 13, wherein said link member is connected to said lift through a third connection interposed between said first connection and said second connection.

15. The apparatus of claim 1, further comprising an attachment bracket for attaching said apparatus to a tongue of a trailer.

16. An apparatus for loading a spring arm of a towing hitch, said apparatus comprising:
   a brace member for fixedly attaching to said towing hitch;
   a link member rotatably attached to said brace member; and
   a lift attached to said link member for lifting said link member to thereby raise said spring arm;
   wherein the link member comprises an elongate member having opposing ends, wherein said link member is attached to said bracket through a first connection, and said link member is attached to said brace through a second connection;
   wherein said link member is connected to said lift through a third connection interposed between said first connection and said second connection.

17. The apparatus of claim 16, wherein said link member is attached to a bracket.

18. The apparatus of claim 17, further comprising a support for receiving the bracket.

19. The apparatus of claim 16, wherein said lift is supported on a base.

20. The apparatus of claim 16, wherein said lift is an inflatable device such that said lift is configured to function as a shock absorber.

21. The apparatus of claim 16, wherein said lift is configured to extend in a direction crosswise with respect to said spring arm.

22. The apparatus of claim 16, wherein the lift is rotatable about a lift pivot.

23. The apparatus of claim 16, further comprising an attachment bracket for attaching said apparatus to a tongue of a trailer.

24. An apparatus for loading a spring arm of a towing hitch, said apparatus comprising:
   a first link member for moving said spring arm and for being operatively connected to said spring arm through a first connection, said first link member being rotatable with respect to a second connection; and
   a lift configured for moving said first link member, said lift being connected to said first link member through a third connection;

wherein movement of said lift causes greater movement of said first link at said first connection than at said third connection.

25. The apparatus of claim 24, wherein said first link member is pivotally attached to a second link member through said second connection.

26. The apparatus of claim 25, wherein said second link member comprises a pivotal connection to allow said second link member to rotate.

27. The apparatus of claim 24, wherein said second link member is non-rotatably fixed to a base.

28. The apparatus of claim 24, wherein said lift is supported on a base.

29. The apparatus of claim 24, wherein said first link member is connected to a bracket through said first connection.

30. The apparatus of claim 24, wherein the lift is rotatable about a lift pivot.

31. The apparatus of claim 24, further comprising an attachment bracket for attaching said apparatus to a tongue of a trailer.

32. An apparatus for loading a spring arm of a towing hitch, said apparatus comprising:
   a lift for moving said spring arm to thereby load said spring arm; and
   means for amplifying movement of said lift such that movement of said lift through a distance produces movement of said spring arm that is greater than said distance.

33. The apparatus of claim 32, wherein said means for amplifying movement of said lift comprises a first link member.

34. The apparatus of claim 33, wherein said first link member is pivotally attached to a bracket member, and wherein said bracket member is configured for receiving said spring arm.

35. The apparatus of claim 33, wherein said first link member is pivotally attached to a second link member, the means for amplifying movement further comprising the second link member.

36. The apparatus of claim 35, wherein said second link member forms a fulcrum such that said first link member rotates about said fulcrum.

37. The apparatus of claim 36, wherein said lift is attached to said first link member between said fulcrum and said bracket.

38. The apparatus of claim 35, wherein said second link member is configured to rotate.

39. The apparatus of claim 34, wherein the bracket is flexible.

40. The apparatus of claim 32, further comprising an electromagnetic device operatively connected to the lift for actuating said lift.

41. The apparatus of claim 40, wherein said electromagnetic device comprises a user interface for controlling electric current to the electromagnetic device.

42. The apparatus of claim 40, wherein said electromagnetic device is a motor.

43. The apparatus of claim 32, wherein said lift is a pulley and flexible member, and wherein the flexible member is disposed in frictional engagement with the pulley such that said flexible member moves responsive to movement in the pulley.

44. The apparatus of claim 43, further comprising an electromagnetic device operatively connected to the pulley for actuating said pulley.

45. The apparatus of claim 44, wherein said electromagnetic device is a motor.

46. The apparatus of claim 32, wherein said lift comprises a threaded member and a body portion configured to receive said threaded member therein such that when the threaded member is rotated relative to said body portion a change of length results therefrom.

47. The apparatus of claim 46, wherein said body comprises a ratchet mechanism disposed in mechanical communication with a lever.

48. The apparatus of claim 47, comprising a plurality of threaded members disposed coaxially relative to each other.

49. The apparatus of claim 48, wherein one of said plurality of threaded members comprises a thread pattern that is reversed from a thread pattern disposed on a second threaded member.

50. The apparatus of claim 32, wherein the lift is rotatable about a lift pivot.

51. An apparatus for loading a spring arm of a towing hitch, said apparatus comprising:
   a bracket for joining with said spring arm to move said spring arm, said bracket comprising an upward extending portion and a lateral extending portion to form a substantial "L" shape, said lateral extending portion being configured for receiving said spring arm thereupon;
   a link member operatively connected to said bracket; and
   a lift operatively connected to said link member, said lift being configured for moving said link member to thereby move said spring arm;
   wherein said link member is pivotally attached to a second link member such that movement of said link member by said lift produces an amplified movement of said bracket.

52. The apparatus of claim 51, wherein said bracket comprises a plurality of openings for receiving a stop to maintain the bracket in position.

53. The apparatus of claim 51, wherein said bracket further comprises a bracket pin and a bracket pin clip for securing the spring arm to the bracket.

54. The apparatus of claim 51, further comprising a support for receiving the bracket.

55. The apparatus of claim 51, wherein the lift is rotatable about a lift pivot.

56. The apparatus of claim 51, wherein said link member is pivotally attached to said bracket.

57. An apparatus for loading a spring arm of a towing hitch, said apparatus comprising:
   a bracket for attaching to said spring arm;
   a lift for lifting said bracket;
   a first link member pivotally connected to said bracket through a first connection;
   a second link member pivotally connected to said first link member through a second connection; and
   a base for supporting said lift;
   wherein said bracket forms a substantial "L" shape having an upright portion and a lateral portion, said lateral portion being configured for receiving said spring arm;
   wherein said bracket comprises a plurality of openings in said upright portion for receiving a stop to maintain the bracket in position;
   wherein said bracket further comprises a bracket pin and a bracket pin clip for securing the spring arm to the bracket;
   further comprising a support for receiving the bracket;
   wherein the lift is a jack;
   wherein said lift is configured to extend in a direction crosswise with respect to said spring arm;

wherein said second link member, said lift, and said bracket are positioned side by side in a direction configured to extend along a length of said spring arm;

wherein the lift comprises a ram and an actuator for causing movement to the ram;

wherein the first link member comprises an elongate member having opposing ends;

wherein said link member is connected to said lift through a third connection, said third connection being interposed between said first connection and said second connection;

further comprising an attachment bracket for attaching said apparatus to a tongue of a trailer;

wherein movement of said first link member by said lift produces a movement of said bracket that is greater than a movement of said first link member at said third connection.

58. An apparatus for loading a spring arm of a towing hitch, said apparatus comprising:

a brace member for fixedly attaching to said towing hitch;

a link member rotatably attached to said brace member; and a lift attached to said link member for lifting said link member to thereby raise said spring arm;

wherein the link member comprises an elongate member having opposing ends, wherein said link member is attached to a bracket through a first connection, and said link member is attached to said brace through a second connection, wherein said spring arm is attached to said link member by said bracket, and wherein said lift is connected to said link member between said first and second connections.

59. An apparatus for loading a spring arm of a towing hitch, said apparatus comprising:

a brace member for fixedly attaching to said towing hitch;

a link member rotatably attached to said brace member; and a lift attached to said link member for lifting said link member to thereby raise said spring arm; wherein the link member comprises an elongate member having opposing ends, wherein said link member is attached to a bracket through a first connection, and said link member is attached to said brace through a second connection;

wherein said link member is connected to said lift through a third connection interposed between said first connection and said second connection; wherein the distance between the first connection and the third connection is greater than the distance between the third connection and the second connection, and wherein said spring arm is attached to said link member by said bracket.

* * * * *